Dec. 11, 1956  W. J. MORRILL  2,773,999
SHADED POLE MOTOR
Filed Jan. 16, 1952
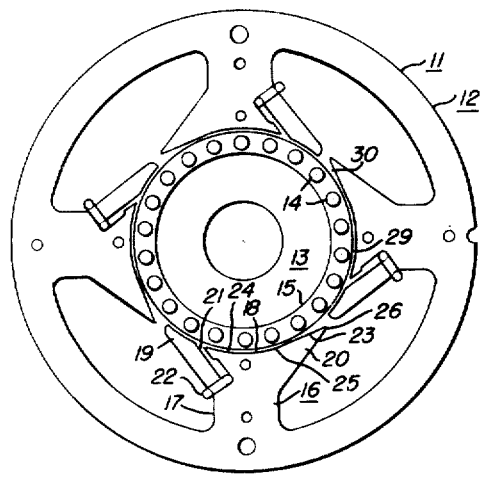
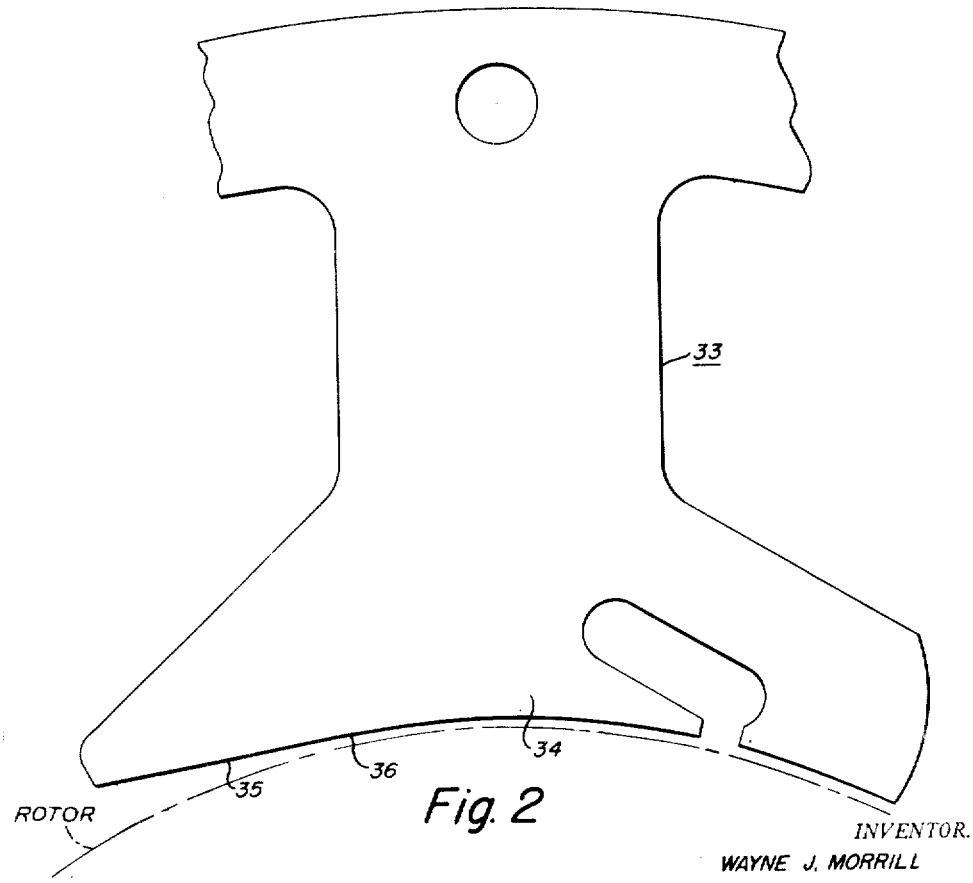
INVENTOR.
WAYNE J. MORRILL

United States Patent Office 2,773,999
Patented Dec. 11, 1956

2,773,999

SHADED POLE MOTOR

Wayne J. Morrill, Garrett, Ind.

Application January 16, 1952, Serial No. 266,755

6 Claims. (Cl. 310—172)

The invention relates in general to induction motors and more particularly to single phase shaded pole induction motors. The prior art form of shaded pole motors disclosed the use of a pole face which has a shading coil on one side and a recessed portion on the other side of this pole face. The shading coils caused a lagging flux component and the recessed portion, or large air gap, caused a leading flux component. This created a starting torque so that the single phase motor could be brought up to running speed. When this construction is used, an improvement may be obtained in the performance of the motor, but higher harmonics are introduced into the stator flux. These higher harmonics cause a dip in the speed torque curve, which dips can be serious enough to prevent the motor from coming up to normal speed, instead it will run at a lower speed caused by one of the harmonic dips. The present invention relates principally to providing one side of the pole face with a tapered surface so that the air gap is gradually enlarged toward the extremity of this pole face. This gradual enlargement of the air gap causes a more gradual change in the flux wave form and more nearly approaches the sinusoidal wave form which is the ideal case. As a sinusoidal wave form is approached, the higher harmonics are reduced. As a result, both the torque dips due to the higher harmonics, and the backward torques produced by these higher harmonics at normal running speed, are reduced. The result is increased rotor efficiency.

The tapering air gap on one side of the pole face thus effects increased rotor efficiency. This achieves an increased torque of the rotor at any given speed when the same amount of flux threads the rotor. In addition to this, the no load speed of the rotor is also increased. As a result of the elimination or reduction of the torque dips caused by the stator harmonics, it is possible to employ a much lower rotor resistance, relative to that used in the prior art, such as alloys of aluminum and of copper, without experiencing difficulty with the rotor "sticking" on a harmonic dip, that is, without danger of the rotor running at a reduced speed. With the use of this lowered rotor resistance, a still further improvement in rotor and hence motor efficiency is achieved. Heretofore, the use of a really low rotor resistance was not possible, because the rotor would tend to stick at low speed due to the presence of the harmonics in the stator flux.

Accordingly it is an object of the invention to produce a stator of a shaded pole induction motor wherein the motor has greater efficiency.

Another object of the invention is to provide a shaded pole induction motor with a new stator design for increased starting torque and increased maximum torque.

Another object of the invention is to provide a shaded pole induction motor with a stator pole face design which eliminates the dip in torque on the speed-torque curve.

Still another object of the invention is to provide a stator construction of a shaded pole motor which provides a better flux wave form which more nearly approaches a sinusoidal distribution.

Yet another object of the invention is to provide a shaded pole induction motor wherein the higher harmonics are reduced and consequently efficiency is increased.

Still another object of the invention is to provide a shaded pole induction motor in which it is possible to use a very low resistance rotor.

Other objects and a fuller understanding of this invention may be had by referring to the following description and claims, taken in conjunction with the accompanying drawing in which:

Figure 1 is a plan view of a stator for a shaded pole induction motor embodying the invention; and Figure 2 is an enlarged view of a pole piece for a six pole induction motor.

The Figure 1 shows an induction motor 11 having a stator 12 and a rotor diagrammatically designated by the reference number 13. The rotor 13 is shown as having a plurality of conductor bars 14 short circuited by a short circuiting ring 15. The Figure 1 shows a four pole machine having identical pole pieces 16, which extend inwardly from the conventional magnetic yoke on the periphery of the stator 12. Each pole piece has a neck portion 17 and a pole face portion 18. The pole face portions have first and second sides 19 and 20, respectively. The first sides 19 each have a slot 21 to accommodate a shading coil 22. Each of the second sides 20 have a flat or diverging surface 23 which merges with the partially cylindrical surface 24 of the pole face at a point 25. These flat surfaces 23 are preferably tangential to the cylindrical surfaces 24 and extend to the tips 26 of the sides 20 of the pole faces. The surfaces 24 and 23 may be considered as first and second portions, respectively, of the second side 19 of the pole face portions.

The rotor 13 preferably has a very small air gap 29 relative to the pole face portions 18. Since the rotor 13 is cylindrical, the air gap 29 is uniform adjacent the first sides 19 and adjacent the main central portion of the pole face portions 18. However, adjacent the flat surfaces 23 an air gap 30 is established which is tapered and which continuously increases toward the tips 26 of the pole faces. These flat surfaces 23 are preferably about fifty electrical degrees.

The Figure 2 shows to an enlarged scale a pole piece 33 designed for a six pole machine. As a result, the arc of the pole face portion 34 is only 60 mechanical degrees, although it is of course 180 electrical degrees. In this design again a flat surface 35 is provided which is approximately fifty electrical degrees and which is tangential to the arc of the pole face portion 34 at a point 36. This pole piece 33 is essentially the same as the pole piece 16 except for the change in arc of the pole face portion.

It has been found that the tapered pole faces, wherein a continuously increasing air gap is provided, aids materially in increasing the efficiency of the induction motor. As the conductor bars 14 pass from one pole piece to the next, they of course pass through a flux field which is reversed 180 degrees. The shading coils 22 help to provide a lagging flux component and the gradually tapering flat surfaces 23 provide an increasingly leading flux component. This has been found to greatly increase the efficiency of the shaded pole motor. An efficiency of about eighteen percent is considered quite common for shaded pole motors and motors actually built in accordance with this invention have tested up to about forty percent efficiency. A theory of operation as to why this much greater efficiency has been achived is that the tapering air gap provides a much smoother flux wave form which more nearly aproaches sinusoidal and thus many of the higher harmonics are reduced.

The elimination of the higher harmonics is explanation of the elimination of the characteristic dip in torque in the speed-torque curve. Ordinarily the shaded pole motor has a dip in the torque at about one-third synchronous speed. It has been found that this tapered air gap design materially increases the starting torque, as well as helping to eliminate this dip in torque. Further, this gradually enlarging air gap increases the maximum torque without reducing the speed at which such maximum torque is developed.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A permeable stator lamination for a shaded pole induction motor comprising, an annular ring, an even number of pole pieces extending inwardly from said ring, a neck and a pole face portion on each pole piece, each pole face portion having first and second sides and defining substantially an arc of a circle, all of said substantial arcs defining a substantially circular opening to closely receive an induction motor rotor, a surface defining a slot in each of said first sides to accommodate a shading coil, said second sides having first and second portions with all said first portions being circular arcs having substantially the same center, said second portions being a straight edge substantially tangent to said arc whereby the air gap between the pole face portion and a rotor is non-uniform and increases substantially tangentially toward the extremities of said second sides, and each of said straight edges defining approximately fifty electrical degrees of said stator lamination.

2. A permeable stator lamination for a shaded pole induction motor comprising, a yoke, an even number of pole pieces extending from said yoke, a neck and a pole face portion on each pole piece, each pole face portion having first and second sides and defining substantially an arc of a circle, all of said substantial arcs defining a substantially circular periphery to closely receive an induction motor rotor, a surface defining a slot in each of said first sides to accommodate a shading coil, each of said second sides having first and second portions with all said first portions being circular arcs having substantially the same center, said second portions having a diverging surface which gradually departs from said arc to provide an increasingly larger air gap between the lamination and a rotor as the extremities of the second sides are approached, each of said diverging surfaces defining approximately fifty electrical degrees of said stator lamination.

3. A shaded pole induction motor comprising, a stator, an even number of pole pieces extending inwardly on said stator, a neck and a pole face portion on each pole piece, each pole face portion having first and second sides and defining substantially an arc of a circle, a rotor, all of said substantial arcs defining a substantially circular opening to closely receive said rotor, conductor means on said rotor having a relatively low resistance relative to alloys of aluminum, a surface defining a slot in each of said first sides to accommodate a shading coil, each of said second sides having first and second portions with all said first portions being circular arcs having substantially the same center, said second portions having a diverging surface which substantially tangentially departs from said arc to provide an increasingly larger air gap between the stator and rotor as the extremities of the second sides are approached, and each of said diverging surfaces defining approximately fifty electrical degrees of said stator lamination.

4. A core structure for a shaded pole motor having a rotor, comprising, a stack of stator laminations, at least two pole faces defining a substantially cylindrical surface on said stack, each of said pole faces having first and second sides, said first sides each having an opening for accommodation of a short circuiting coil and being less than half of said pole face, and each of said second sides having first and second portion with all said first portions being cylindrical arcs having substantially the same axis to thus provide a uniform air gap with said rotor, said first portions being of greater extent than said second portions and having a departing edge initially tangent to said cylindrical surface so that the said departing edge departs from said substantially cylindrical surface.

5. A shaded pole induction motor comprising, a stator, at least two pole faces defining a substantially cylindrical surface on said stator, a rotor defining with said cylindrical surface a small air gap, conductor means on said rotor having a relatively low resistance relative to alloys of aluminum, each of said pole faces having first and second sides with said first side being less than half of said pole face, and each of said second sides having first and second portions with all said first portions being cylindrical arcs having substantially the same axis to thus provide a uniform air gap with said rotor, said first portions being of greater extent than said second portions and having a surface gradually departing from said cylindrical surface whereby said air gap gradually enlarges toward the extremity of said first side.

6. A permeable stator lamination for a shaded pole induction motor comprising, a yoke, an even number of pole pieces extending from said yoke, a neck and a pole face portion on each pole piece, each pole face portion having first and second sides and defining substantially an arc of a circle, all of said substantial arcs defining a substantially circular periphery, said second sides having first and second portions with all said first portions being circular arcs having substantially the same center, said second portions being an edge defining part of said periphery and substantially continuously departing from said circular periphery toward the extremity of said first side, each of said edges defining approximately fifty electrical degrees of said stator lamination.

References Cited in the file of this patent

UNITED STATES PATENTS

| 1,002,718 | Marelli | Sept. 5, 1911 |
| 1,823,979 | Jordan | Sept. 22, 1931 |
| 1,884,140 | Nickle | Oct. 25, 1932 |
| 2,185,990 | Schurch | Jan. 2, 1940 |
| 2,591,117 | Ballentine | Apr. 1, 1952 |

UNITED STATES PATENT OFFICE

CERTIFICATE OF CORRECTION

Patent No. 2,773,999  December 11, 1956

Wayne J. Morrill

It is hereby certified that error appears in the printed specification of the above numbered patent requiring correction and that the said Letters Patent should read as corrected below.

Column 4, line 19, for "portion" read —portions—; line 40, for "first" read —second—.

Signed and sealed this 22nd day of October 1957.

(SEAL)
Attest:

KARL H. AXLINE
Attesting Officer

ROBERT C. WATSON
Commissioner of Patents